United States Patent [19]

Satomura et al.

[11] Patent Number: 5,347,517
[45] Date of Patent: Sep. 13, 1994

[54] INFORMATION PROCESSING APPARATUS

[75] Inventors: Seiichiro Satomura, Kawasaki; Kano Takeshita, Yokohama, both of Japan

[73] Assignee: Canon Kabushiki Kaisha, Tokyo, Japan

[21] Appl. No.: 117,656

[22] Filed: Sep. 8, 1993

Related U.S. Application Data

[63] Continuation of Ser. No. 611,747, Nov. 13, 1990, abandoned.

[30] Foreign Application Priority Data

Nov. 16, 1989 [JP] Japan ................... 1-298119
Dec. 21, 1989 [JP] Japan ................... 1-329682

[51] Int. Cl.$^5$ .................. G06F 11/00; H04L 12/00; G11B 5/09
[52] U.S. Cl. .................. 371/55; 371/47.1; 360/51; 360/26
[58] Field of Search .................. 371/5.5, 47.1, 60; 360/36, 53, 51, 31, 26

[56] References Cited

U.S. PATENT DOCUMENTS

| | | | |
|---|---|---|---|
| 3,887,942 | 6/1975 | Horowitz | 360/51 |
| 4,208,650 | 6/1980 | Horn | 371/47.1 |
| 4,672,483 | 6/1987 | Kawada | 360/51 |
| 4,760,574 | 7/1988 | Budworth et al. | 371/5.5 |
| 4,762,985 | 8/1988 | Imai et al. | 250/201 |
| 4,870,647 | 9/1989 | Hikawa et al. | 360/53 |
| 4,908,812 | 3/1990 | Aoshima et al. | 360/51 |
| 5,067,128 | 11/1991 | Nakane | 371/55.5 |

FOREIGN PATENT DOCUMENTS

| | | |
|---|---|---|
| 0244665 | 11/1987 | European Pat. Off. |
| 58-164011 | 9/1983 | Japan |
| 59-167813 | 9/1984 | Japan |
| 61-142574 | 6/1986 | Japan |
| 2092310 | 11/1982 | United Kingdom |

OTHER PUBLICATIONS

IBM Technical Disclosure Bulletin, *Window-Shifting Mechanism In Data Separator*, vol. 30, No. 6, Nov. 1987, pp. 38-40.

IBM Technical Disclosure Bulletin, *Resynchronizer*, J. H. King Jr. et al., vol. 15, No. 9, Feb. 1973, pp. 2728-2729.

IBM Technical Disclosure Bulletin, *Read Time Pulse Selection Apparatus*, A. R. Harrison et al., vol. 5, No. 7, Dec. 1962, pp. 70-72.

*Primary Examiner*—Robert W. Beausoliel, Jr.
*Assistant Examiner*—Trinh L. Tu
*Attorney, Agent, or Firm*—Fitzpatrick, Cella, Harper & Scinto

[57] ABSTRACT

An information processing apparatus having the function of reproducing digital information recorded on a recording medium has binarizing circuit for transforming a reproduction signal read from the recording medium into a binary signal, circuit for making from the binary signal a bit synchronous signal for use when the binary signal is demodulated, circuit for detecting the inverted portion of the binary signal by a periodical window of a predetermined period and producing a synchronous binary signal synchronized with the bit synchronous signal in accordance with the result of the detection, demodulating circuit for demodulating the digital information on the recording medium on the basis of the synchronous binary signal, and circuit for varying the period of the window in conformity with the situation.

According to the above method, any small defect likely to develop into an error in the future is effectively detected to thereby obviate such a situation that the detection of a synchronous pattern becomes impossible or the reproduction of data becomes impossible.

14 Claims, 13 Drawing Sheets (a) REPRODUCTION SIGNAL
(b) BINARY DATA
(c) SYNCHRONOUS CLOCK
(d) OUTPUT OF FF CKT 14
(e) SYNCHRONOUS DATA

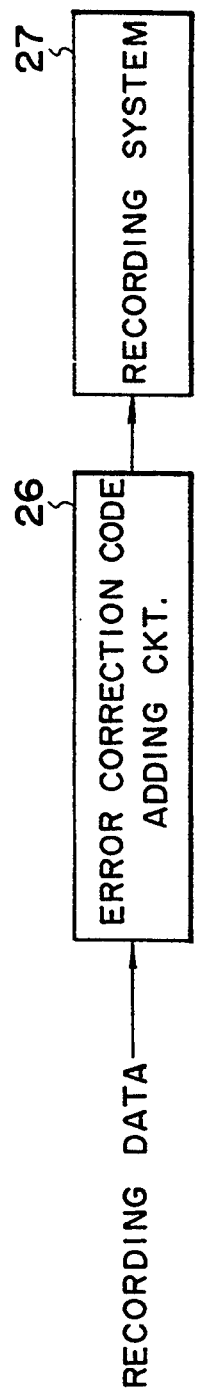
F I G. 10
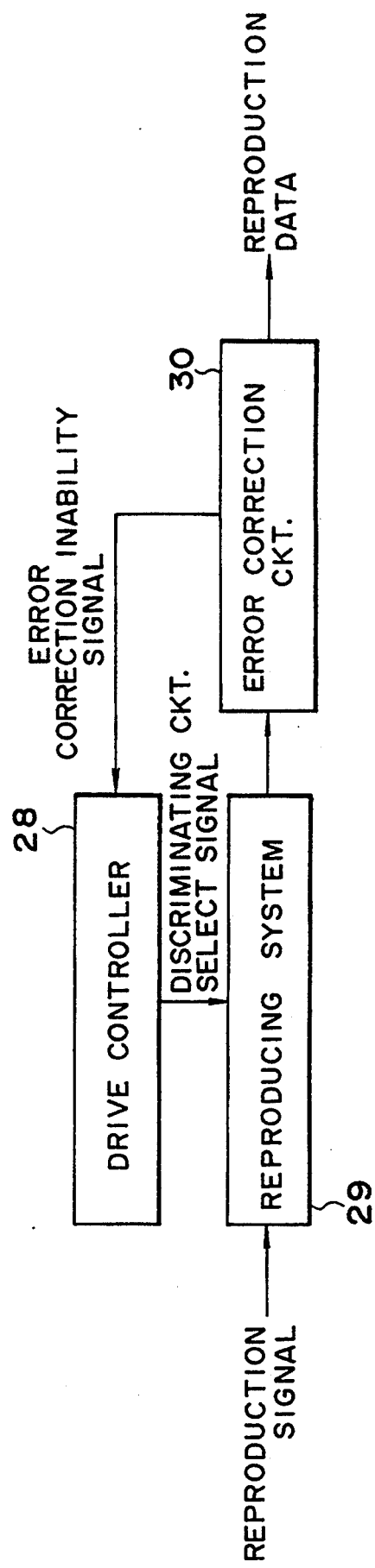
F I G. 11

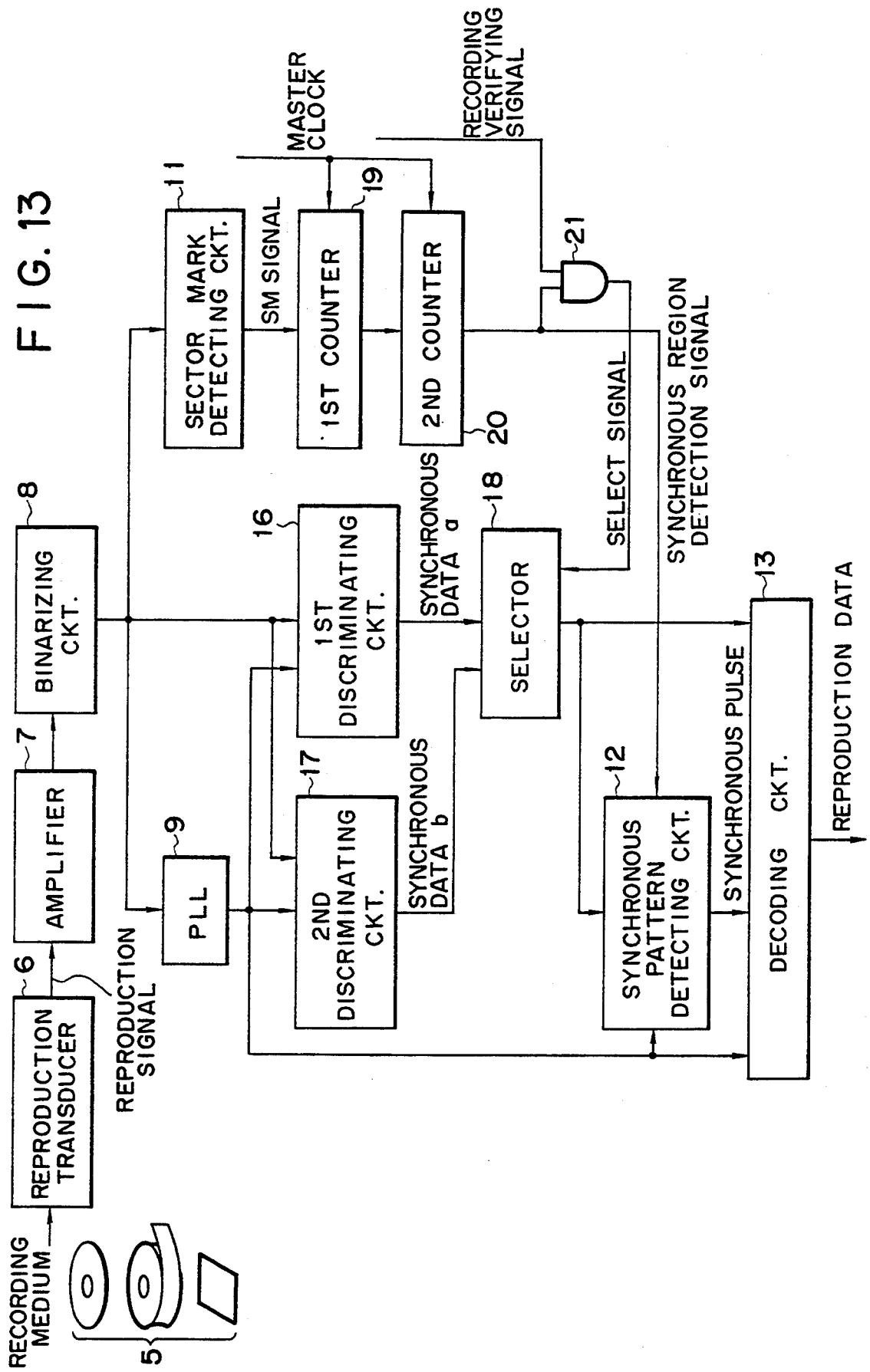

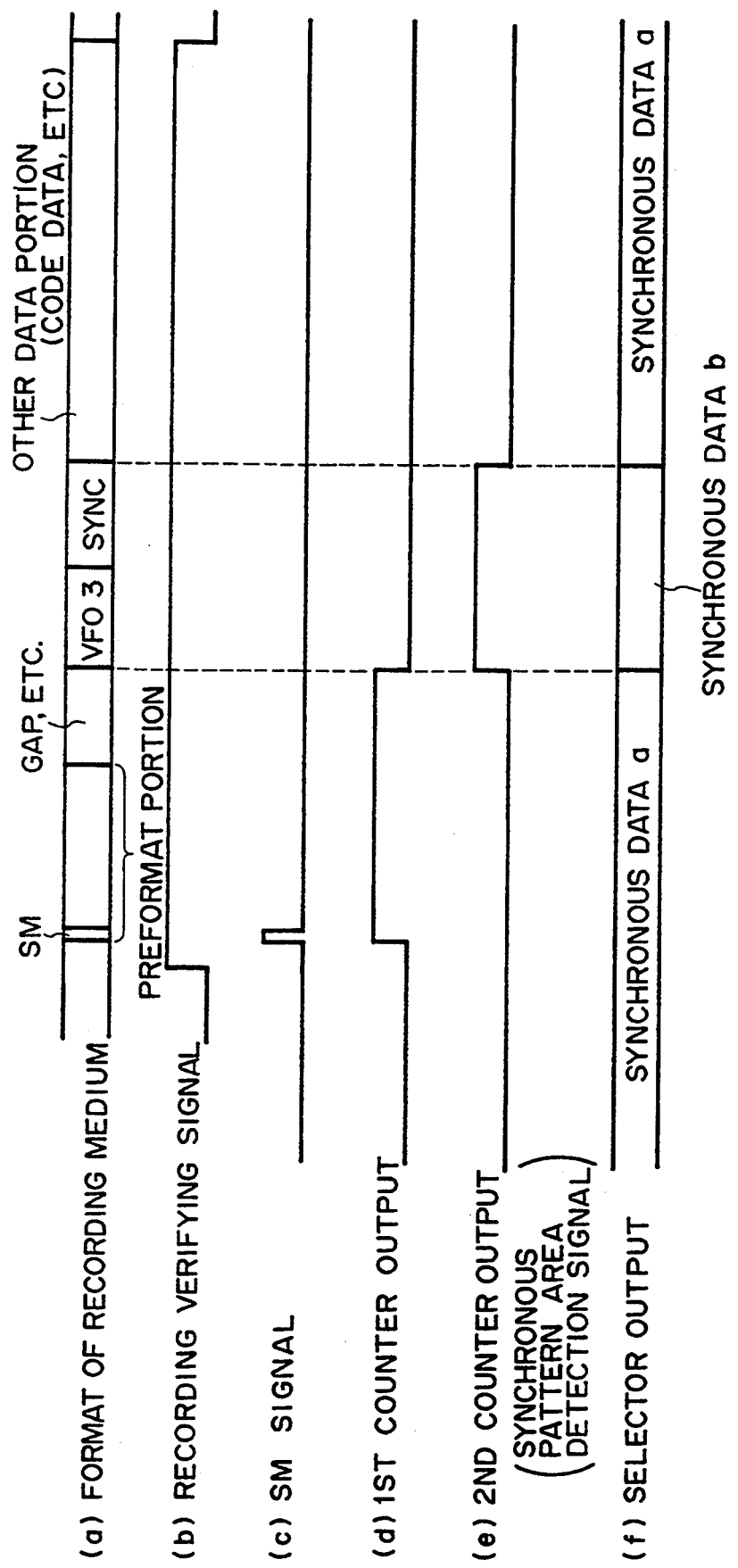

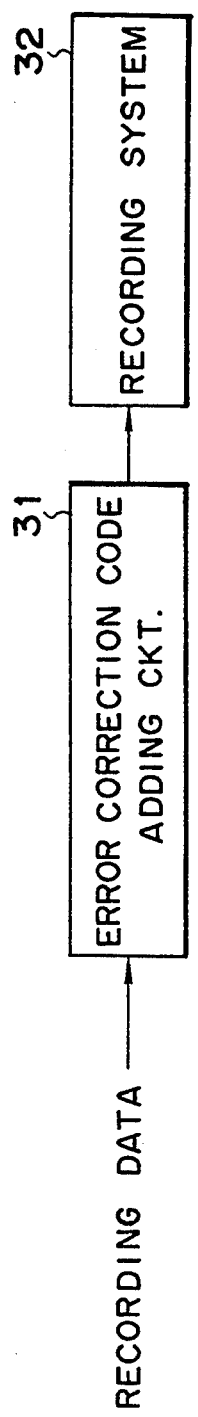
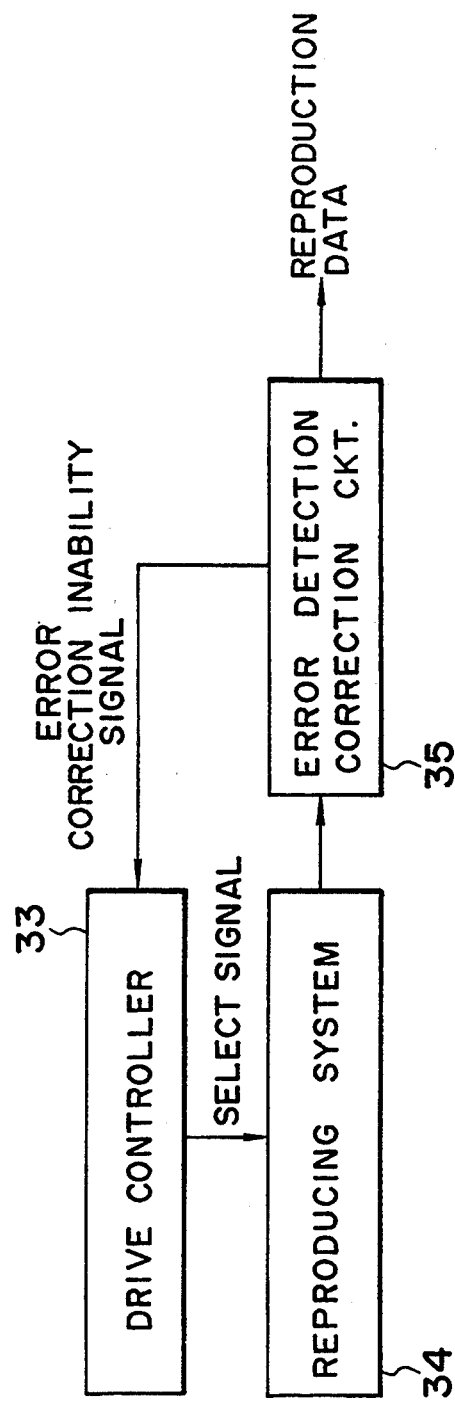

INFORMATION PROCESSING APPARATUS

This application is a continuation of application Ser. No. 07/611,747 filed Nov. 13, 1990, now abandoned.

BACKGROUND OF THE INVENTION

1. Field of the Invention

This invention relates to an information processing apparatus, and in particular to a digital information recording-reproducing apparatus for recording and reproducing information by the use of a recording medium such as an optical disk or a magneto-optical disk.

2. Related Background Art

FIG. 1 of the accompanying drawings shows a block diagram of the recording system of an information recording-reproducing apparatus according to the prior art, and FIG. 2 of the accompanying drawings shows a block diagram of the reproducing system of the apparatus.

The recording system, as shown in FIG. 1, is comprised of an encoding circuit 1, a synchronous pattern adding circuit 2, an amplifier 3 and a recording transducer 4. Recording data is encoded by the encoding circuit 1, whereafter a synchronous pattern is added to the encoded recording data by the synchronous pattern adding circuit 2, and further the encoded recording data is amplified by the amplifier 3. The amplified data is sent to the recording transducer 4, in which it is recorded on a recording medium 5. The recording medium 5 may be one of various mediums such as a disk-like medium like an optical disk or a magneto-optical disk, a tape-like medium and a card-like medium.

On the other hand, the reproducing system, as shown in FIG. 2, is provided with a reproduction transducer 6 for reading recorded information from the recording medium, an amplifier 7 for amplifying the signal read by the reproduction transducer 6, and a binarizing circuit 8 for converting the amplified signal into binary signals of 1 and 0. PLL 9 is a circuit for producing a synchronous clock from a reproduction signal when reproducing the recorded signal by a self-clocking reproduction system, and a discriminating circuit 10 is a circuit for synchronizing the binary data by the synchronous clock and producing synchronous data.

A sector mark detecting circuit 11 is a circuit for detecting a sector mark recorded on the recording medium 5 and outputting a sector mark detection signal (SM signal). This SM signal is sent to a synchronous pattern detecting circuit 12, by which the synchronous pattern added by the synchronous pattern adding circuit 2 is detected with the SM signal as the reference, and a synchronous pulse is output on the basis thereof. The synchronous pattern is indicative of the code data read-out starting position, and in a decoding circuit 13, data encoded on the basis of the synchronous pattern is decoded into the original data. There are known various encoding systems such as FM, MFM, Miller$^2$ and EFM (2.7).

FIG. 3 of the accompanying drawings shows an example of the recording format of the recording medium 5. In FIG. 3, SM designates the sector mark, and Sync denotes the synchronous pattern. In this example, the sector mark is 5 B (bytes) and the synchronous pattern is 3 B. The synchronous pattern detecting circuit 12, as previously described, detects the synchronous pattern with the sector mark as the reference. VFO designates a predetermined period pattern for locking PLL 9.

FIG. 4 of the accompanying drawings shows an example of the discriminating circuit 10. In this example, the discriminating circuit 10 is comprised of two D type flip-flop circuits (hereinafter referred to as FF circuits) 14 and 15. A signal "1" is normally input to the D terminal of the FF circuit 14, and binary data is input to the CK (clock) terminal of the FF circuit 14. The output signal of the FF circuit 14 is input to the D terminal of the FF circuit 15, and a synchronous clock is input to the CK terminal of the FF circuit 15.

The operation of the discriminating circuit 10 will now be described with reference to a time chart shown in FIG. 5 of the accompanying drawings.

FIG. 5(a) shows a reproduction signal read out by the reproduction transducer 6, FIG. 5(b) shows binary data obtained by binarizing this reproduction signal by the binarizing circuit 8 (in this case, binarizing the reproduction signal by the use of the differentiation detection method), and FIG. 5(c) shows the synchronous clock produced by PLL 9. FIG. 5(d) shows the output signal of the FF circuit 14. One period t of the synchronous clock is defined as a detection window for the rising edge of the binary data. That is, when the binary data has risen during $\pm\frac{1}{2}t$ of the synchronous clock, the discriminating circuit 10 discriminates that binary data as a pulse. Accordingly, since in FIG. 5, the binary data rises during the window period of $\pm\frac{1}{2}t$, synchronous data is output from the FF circuit 15, as shown in FIG. 5(e).

Now, the recording medium, when injured or flawed by some cause or other, becomes unable to reproduce data correctly or detect the synchronous pattern correctly. So, generally the information recording-reproducing apparatus of this type is endowed with the verifying function of reproducing recorded data after the termination of recording to thereby check up whether the data has been recorded correctly. However, when such a small defect that cannot be discovered by the verifying check-up is present in the recording medium, it may develop into an error in the future due to a variation with time in the recording medium, a change in the environmental conditions of the apparatus or the irregularity of individual apparatuses, thus causing unsatisfactory detection of the synchronous pattern or unsatisfactory reproduction of data. In such a case, in the aforedescribed reproducing system, reproduction is effected always under the same conditions, irrespective of the ordinary reproduction or the reproduction during the verifying check-up and therefore, the small defect as previously mentioned cannot be discovered and thus, it has been difficult to prevent unsatisfactory reproduction.

SUMMARY OF THE INVENTION

The present invention has been made in view of such circumstances and an object thereof is to provide an information recording-reproducing apparatus designed such that any small defect likely to develop into an error in the future is effectively detected to thereby obviate such a situation that the detection of a synchronous pattern becomes impossible or the reproduction of data becomes impossible.

The present invention achieves the above object by an information processing apparatus having the function of reproducing digital information recorded on a recording medium, and having binarizing means for transforming a reproduction signal read from the recording medium into a binary signal, means for producing from said binary signal a bit synchronous signal for use when said binary signal is demodulated, means for detecting the inverted portion of said binary signal by a periodical window of a predetermined period and producing a synchronous binary signal synchronized with said bit synchronous signal in accordance with the result of said detection, demodulating means for demodulating the digital information on said recording medium on the basis of said synchronous binary signal, and means for varying the period of said window in accordance with the situation.

The invention will be described in greater detail with respect to some embodiments thereof.

BRIEF EXPLANATION OF THE DRAWINGS

FIG. 10 is a schematic block diagram of a recording system apparatus showing a second embodiment of the present invention, FIG. 11 is a schematic block diagram of a reproducing system apparatus showing the second embodiment of the present invention.

FIG. 13 is a block diagram showing a third embodiment of the information recording-reproducing apparatus of the present invention.

FIGS. 14(a)–(f) are time charts showing the producing operation for the select signal shown in FIG. 13.

FIG. 15 is a schematic block diagram of a recording system apparatus showing a fourth embodiment of the present invention.

FIG. 16 is a schematic block diagram of a reproducing system apparatus showing the fourth embodiment of the present invention.

DESCRIPTION OF THE PREFERRED EMBODIMENTS

Figure 6:
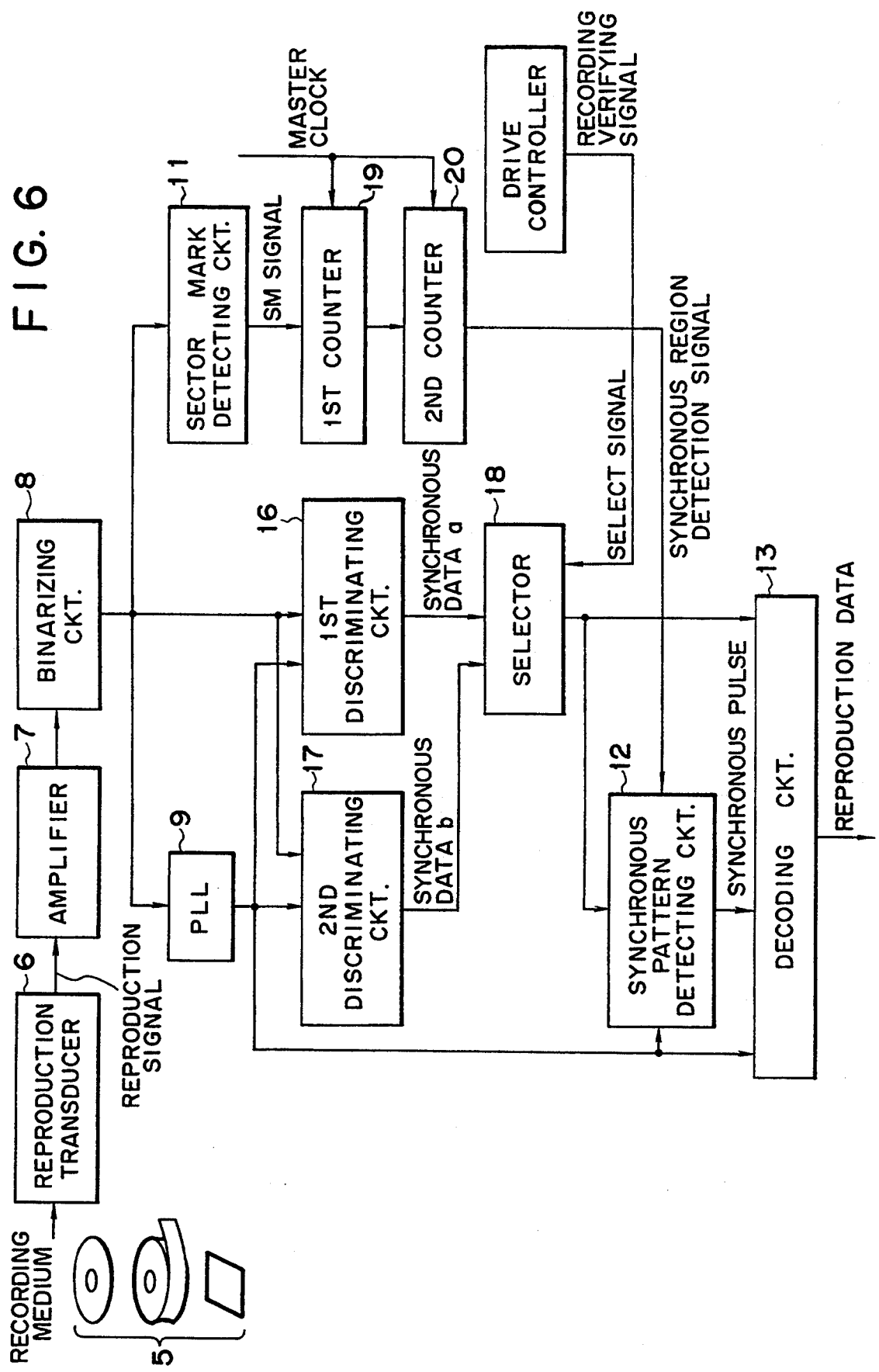
FIG. 6 is a block diagram showing a first embodiment of the information recording-reproducing apparatus of the present invention.

Some embodiments of the present invention will hereinafter be described in detail with reference to the drawings. FIG. 6 is a block diagram showing a first embodiment of the information recording-reproducing apparatus of the present invention. In FIG. 6, portions identical to those of the prior-art apparatus are given identical reference numerals and need not be described.

In FIG. 6, a first discriminating circuit 16 and a second discriminating circuit 17 are circuits for detecting the rising edge of binary data output from a binarizing circuit 8 during each predetermined window period. A selector 18 is a circuit for selecting the first discriminating circuit 16 or the second discriminating circuit 17 by the select signal of a drive controller which will be described later. Accordingly, the output of the discriminating circuit selected by the selector 18 is supplied to a synchronous pattern detecting circuit 12 and a decoding circuit 13.

Figure 4:
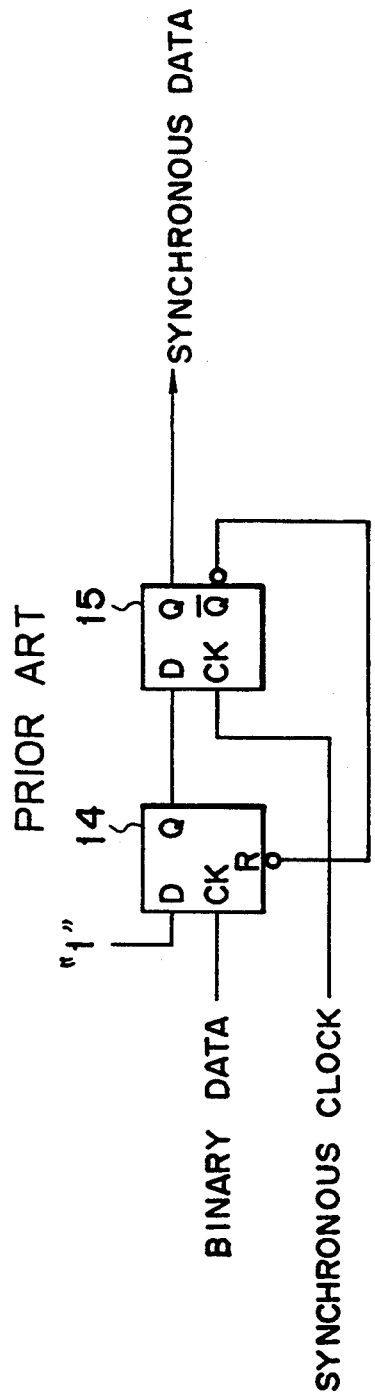
FIG. 4 is a circuit diagram of a discriminating circuit used in the reproducing system shown in FIG. 2.
Figure 5:
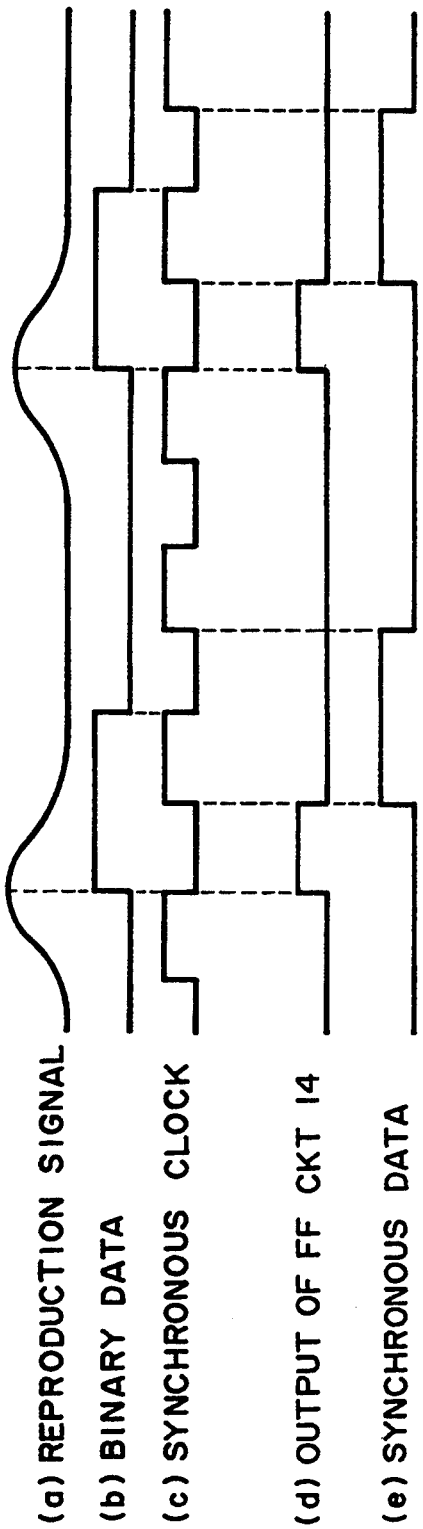
FIGS. 5(a)–(e) are time charts showing the operation of the discriminating circuit.

In the present embodiment, the circuit shown in FIG. 4 is used as the first discriminating circuit 16. In contrast, the second discriminating circuit 17 is of the circuit construction shown in FIG. 7. The discriminating circuit shown in FIG. 4, as previously described, is set to the window period of $\pm \frac{1}{2}t$, while the second discriminating circuit 17 is set to $\pm \frac{1}{4}t$.

The specific construction of the second discriminating circuit 17 shown in FIG. 7 will now be described.

The second discriminating circuit 17 is comprised of three FF circuits 22–24 and a delay circuit 25. The delay circuit 25 is a delay circuit for delaying $\frac{1}{4}$ of one period of a synchronous clock, and the signal delayed by $\frac{1}{4}t$ is input to the R (reset) terminal of the FF circuit 22. Binary data is input to the CK (clock) terminal of the FF circuit 22, whereby the output of the FF circuit 22 assumes a high level at the rising of the binary data and reverses to a low level at the falling of the output of the delay circuit 25. Also, the output of the FF circuit 22 is input to the CK terminal of the FF circuit 23, and the FF circuit 23 is reset by the inverted output of the FF circuit 24. Further, a synchronous clock is input to the CK terminal of the FF circuit 24 and the output signal of the FF circuit 23 is input to the D terminal of the FF circuit 24 and as a result, synchronous data is obtained from the output of the FF circuit 24. A signal "1" is normally input to the D terminals of the FF circuits 22 and 23.

Figure 7:
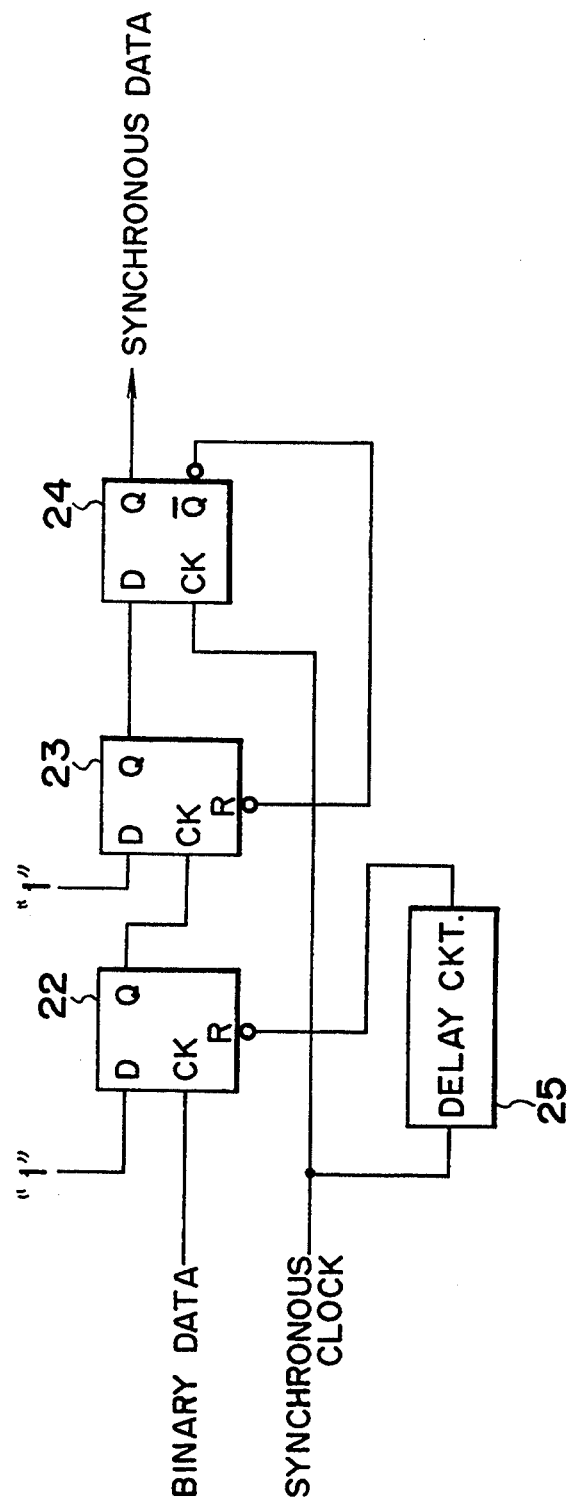
FIG. 7 is a circuit diagram showing a specific example of the second discriminating circuit shown in FIG. 6.
Figure 8:
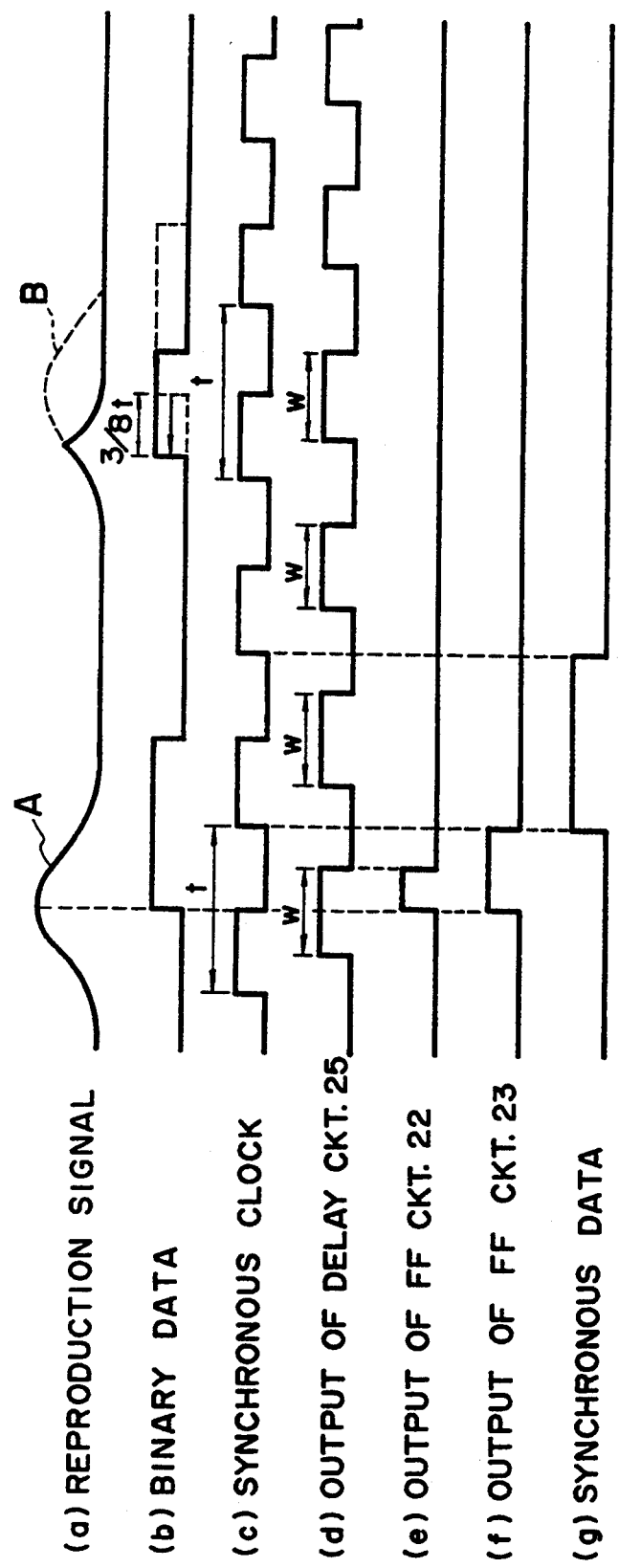
FIGS. 8(a)–(g) are time charts showing the operation of the second discriminating circuit shown in FIG. 6.

FIG. 8 shows the signal waveforms of various portions of the second discriminating circuit 17 shown in FIG. 7. The operation will hereinafter be described with reference to FIG. 8.

The basic concept of the present invention will first be described. The crest A of a reproduction signal shown in FIG. 8(a) is a rightly reproduced signal. On the other hand, B in FIG. 8(a) shows a signal which should originally have been a crest, but has become abnormal by a reason such as a flaw or a stain on the recording medium or the defect or noise of the medium. In this example, the phase is advanced by $\frac{3}{8}t$. Generally, a code "1" or "0" is judged by whether the peak position of the crest of a reproduction signal exists within a window which exists in a 1-bit period. The peak position of the crest of the reproduction signal of FIG. 8(a) is made into the rising edge of the binary data of FIG. 8(b) by the binarizing circuit 8. On the other hand, the window is generally set to a position of $\pm \frac{1}{2}t$ relative to the average edge position. Here, t is a clock period. That is, generally, the window is as wide as t from the synchronous clock rising edge shown in FIG. 8(c) to the next rising edge.

According to this method, in spite of the fact that in the crest B wherein there is abnormality, the binary data deviates forwardly by $\frac{3}{8}t$ from the normal position, the rising edge thereof exists between the two rising edges of the synchronous clock and thus, the binary data is rightly reproduced as "1".

However, although this crest B is rightly reproduced, it deviates forwardly by ⅜t from its original position and therefore should be recognized as abnormality. If this is not done, the quality of the signal will be deteriorated in the future and the crest will become small even though the signal can be reproduced rightly at that point, and this may lead to the danger that it cannot be reproduced. So, the window is reduced as shown in FIG. 8(d) so that such an abnormal signal may be daringly reproduced as "0". That is, the pulse which has thus become out of phase can be rightly judged as "1" if the window is kept wide, but nevertheless, it is daringly discriminated as "0" by reducing the window. The specific operation will now be described.

FIG. 8(a) shows the reproduction signal read by the reproduction transducer 6, FIG. 8(b) shows the binary data output from the binarizing circuit 8, and FIG. 8(c) shows the synchronous clock produced by PLL 9. The delay circuit 25 is a circuit for delaying the synchronous clock by ¼ of the period thereof as previously described, and as shown in FIG. 8(d), the output of the delay circuit rises to a high level at a time intermediate of the high level of the synchronous clock, and falls at a time intermediate of the low level of the synchronous clock. In FIG. 8(d), the high level period of the output of the delay circuit 25 is shown as W, and this W is the window period of the second discriminating circuit 17. That is, the FF circuit 22 is reset by the inverted signal of the output of the delay circuit 25 and therefore, detection of the binary data is effected only within the window period which is the high level period of the output of the delay circuit 25. Accordingly, the synchronous data is output only when the rising edge of the binary data is within the window period.

Here, the reproduction signal shown as A in FIG. 8(a) is a normal reproduction signal. In response to this reproduction signal, the binary data as shown in FIG. 8(b) is output from the binarizing circuit 8 and the synchronous clock as shown in FIG. 8(c) is output from PLL 9. As previously described, the high level period of the output of the delay circuit 25 is the window period, and in FIG. 8, the rising edge of the binary data is in this window period. Therefore, a pulse signal which, as shown in FIG. 8(e), assumes a high level at the rising edge of the binary data and assumes a low level at the falling of the delay circuit 25 is first output from the FF circuit 22. Then, in response to this pulse signal, a pulse signal as shown in FIG. 8(f) is output from the FF circuit 23. This pulse signal assumes a high level at the rising of the output of the FF circuit 22, and assumes a low level at the rising of the synchronous clock. As a result, synchronous data delayed by a half period of the synchronous clock with respect to the binary data, as shown in FIG. 8(g), is output from the FF circuit 24.

On the other hand, the signal shown as B in FIG. 8(a) is a reproduction signal which was not reproduced rightly, for example, because of the defect of the recording medium, as previously described. Thus, the binary data shown in FIG. 8(b) is advanced by ⅜t in phase with respect to the normal position. In the case of this reproduction signal, the rising edge of the binary data is not within the window period W and therefore, the rising thereof is not detected in the second discriminating circuit 17 and the synchronous data is not output. Accordingly, any defective reproduction signal is not detected, but is treated as a recording error during recording verifying check-up as will be described later.

The first discriminating circuit 16 has its window period set to twice that of the second discriminating circuit 17, as previously described. This window period corresponds to one period of the synchronous clock shown as t in FIG. 8(c). Accordingly, in the first discriminating circuit 16, the edges of both of the reproduction signals A and B are detected because the rising edge of the binary data is within the window period t, and synchronous data is output.

In the embodiment of FIG. 6, one of the first discriminating circuit 16 and the second discriminating circuit 17 is selected by a discriminating circuit select signal output from a drive controller. In the case of ordinary reproduction, a select signal for selecting the first discriminating circuit 16 is output from the drive controller, and the selector 18 selects the first discriminating circuit 16 in accordance with this select signal. In contrast, during the recording verifying check-up after data recording, a signal for selecting the second discriminating circuit 17 is output from the drive controller. That is, it is to be understood that during the verifying check-up after data recording, the window is reduced and detection is effected under severe conditions.

When the first discriminating circuit 16 and the second discriminating circuit 17 are controlled in this manner, the abnormal reproduction signal as previously described can be treated as a recording error by reducing the window during the recording verifying check-up. Unsatisfactory reproduction is gradually increased by a cause such as a variation with time in the recording medium, the flaw or defect of the recording medium, or a change in the environmental conditions of the apparatus and/or the recording medium, or the irregularity of individual apparatuses. Accordingly, there may occur such a situation that although no abnormality exists during the recording verifying check-up, reproduction will become impossible in the future due to the cause as mentioned above. In such a case, reproduction is effected under severe conditions during the recording verifying check-up and therefore, any small defect which is likely to become worse in the future can be eliminated beforehand and thus, the impossibility of reproduction in the future can be obviated.

Figure 9:
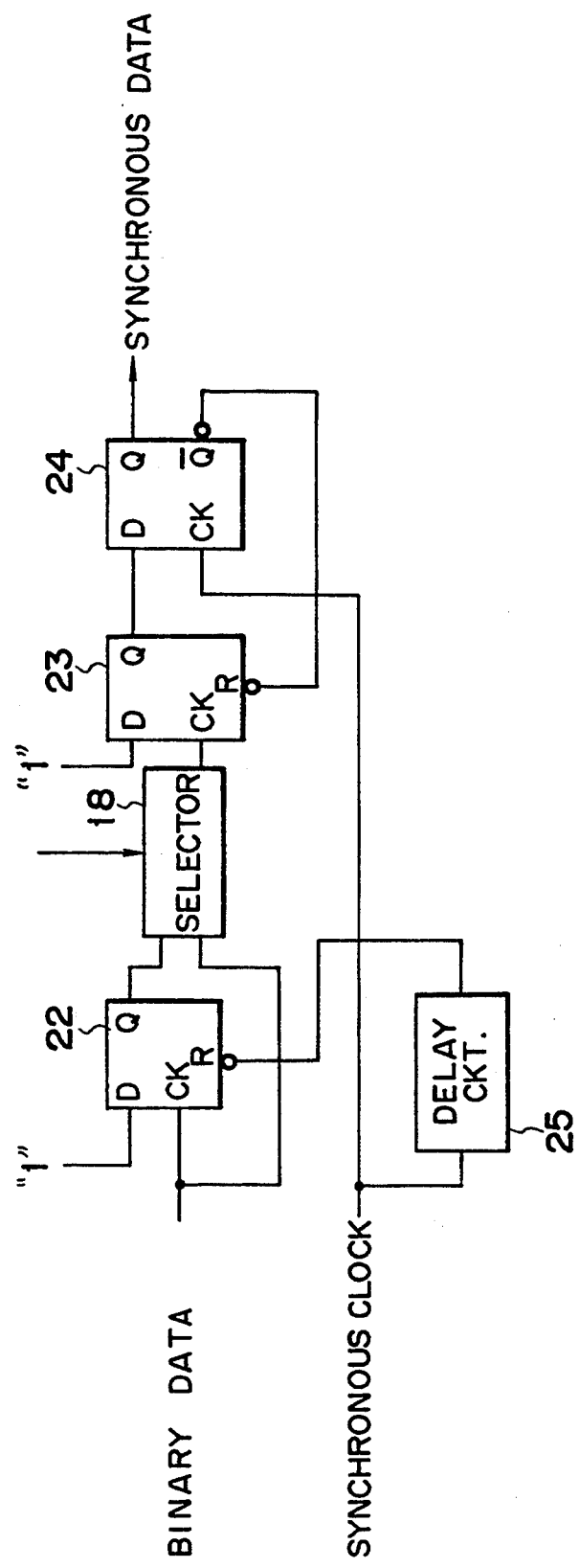
FIG. 9 is a circuit diagram showing another example of the construction of the discriminating circuit shown in FIG. 6.

FIG. 9 shows another example of the construction of the discriminating circuit.

This construction is one in which a selector 18 is connected between the FF circuit 22 and the FF circuit 23, and is designed such that the selector 18 selects the output of the FF circuit 22 and binary data. Where the selector 18 selects the output of the FF circuit 22, the circuit construction is entirely the same as the second discriminating circuit 17 shown in FIG. 7. On the other hand, where the selector 18 selects the binary data, the circuit construction is just the same as the discriminating circuit shown in FIG. 4, and is the same circuit construction as the first discriminating circuit 16. Accordingly, in this example, the FF circuits 23 and 24 are provided in common by the first and second discriminating circuits 16 and 17 and thus, the circuit construction can be simplified.

A second embodiment of the present invention will now be described.

FIG. 10 shows a schematic block diagram of a recording system apparatus for carrying out the second embodiment, and FIG. 11 shows a schematic block diagram of a reproducing system apparatus for carrying out the second embodiment.

First, the recording system apparatus is comprised of an error correction code adding circuit 26 for adding error correction codes to recording data, and a recording system 27 for recording on the recording medium the recording data to which the error correction codes have been added by the circuit 26. The error correction codes include various codes such as a Hamming code, BCH code, a Reed Solomon code and a fire code.

The reproducing system apparatus is comprised of a drive controller 28 for controlling the selector 18, a reproducing system 29 shown in FIG. 6, and an error correction circuit 30 for correcting the error of the data reproduced by the reproducing system 29. In this embodiment, the drive controller 28 is designed to instruct the selector 18 of the reproducing system 29 to select the second discriminating circuit 17 during ordinary reproduction and thereby reduce the window during ordinary reproduction.

Where the window is thus reduced during ordinary reproduction, if the defect or flaw of the recording medium is small, reproduction error will be small and can be corrected by the error correction circuit 30. On the other hand, when it becomes impossible due to a variation with time in the recording medium or the enlargement of the flaw or defect of the recording medium to reproduce data by a narrow window, the drive controller 28 instructs the selector 18 of the reproducing system 29 to select the first discriminating circuit 16. Thereby, the window for discriminating the pulse of the reproducing system 29 becomes wider and therefore, reproduction error will become small and can likewise be corrected by the error correction circuit 30. Accordingly, in this embodiment, control is effected so that the discriminating circuit is changed over to widen the window when the number of error corrections increases and reaches a certain set value. By thus widening the window in conformity with the number of error corrections, the data reproduction process can be accomplished and the degree of deterioration of the quality of recording can also be known.

Figure 12:
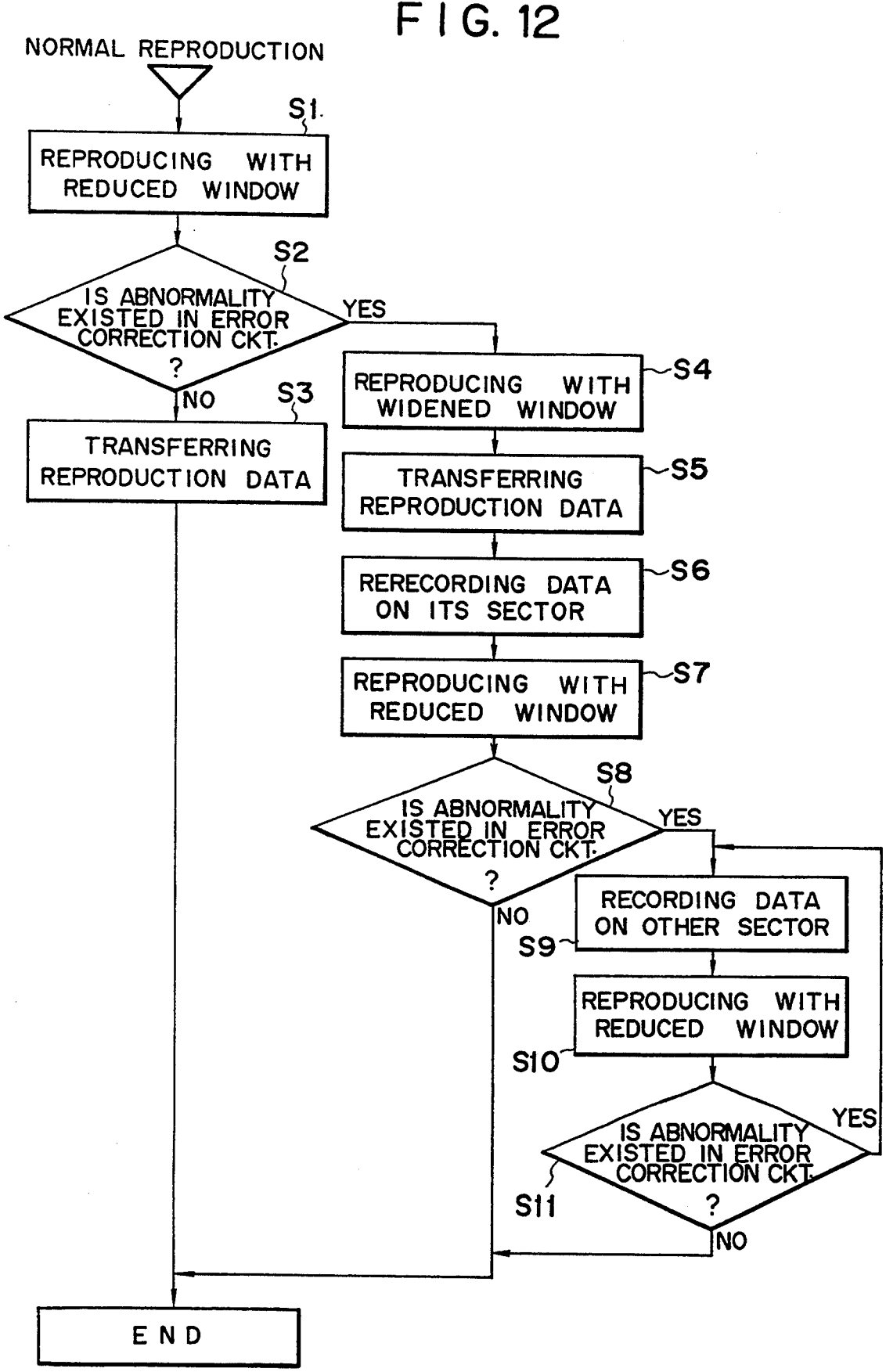
FIG. 12 is a flow chart showing the operation of an example of the reproducing system apparatus of FIG. 11.

Also, when as shown in FIG. 12, reproduction is effected with the window reduced during ordinary reproduction, if errors are many, it is also possible to carry out the reproduction error preventing process such as carrying out re-recording. This operation will hereinafter be described with reference to FIG. 12.

First, at S (step) 1, the second discriminating circuit 17 is selected and the reproducing process is carried out while reducing the window. Then, at S2, whether there exists abnormality in the error correction circuit 30 is judged, and if there exists no abnormality, reproduction data is transferred at S3. That is, if the number of error corrections of the error correction circuit 30 is within the correction process ability, there exists no abnormality at S2 and reproduction data is transferred at S3. On the other hand, if at S2, the number of error corrections exceeds the process ability and abnormality arises in the error correction circuit 30, the first discriminating circuit 16 is selected at S4, whereby reproduction is effected with the window widened. Then, at S5, reproduction data is transferred and at S6, the reproduction data is recorded on the same sector as last one, and at S7, the second discriminating circuit 17 is now selected and the reproduction of the data is effected with the window reduced.

Thereafter, at S8, whether there exists abnormality in the error correction circuit 30 is judged again, and if there exists no abnormality, the process is terminated.

On the other hand, if there exists abnormality in the error correction circuit 30, at S9, the data is recorded on other sector, and at S10, reproduction is effected with the window reduced. Then, at S11, whether there exists in the error correction circuit 30 is judged in the same manner as previously described, and if there exists no abnormality, the process is terminated, and if there exists abnormality, return is made to S9, where the process of recording the data on other sector is carried out again. The process of S9–S10 is repetitively carried out and when the abnormality of the error correction circuit 30 has become null, the process is terminated. At all of S2, S8 and S11, the abnormality of the error correction circuit 30 has been defined as the time when the correction process ability therefor is exceeded, whereas this is not restrictive, but the set value of the number of error corrections may be predetermined and the time when the actual number of corrections exceeds this set value may be judged as abnormality.

In this embodiment, each time the reproducing process is carried out, the correction state of the error correction circuit is checked up and if as a result, the number of error corrections is greater than the set value, re-recording is effected. Moreover, during ordinary reproduction, the data is reproduced with the window reduced and therefore, with regard even to the small defect as mentioned previously, the re-recording process can be carried out to thereby positively prevent any reproduction error in the future. Particularly this embodiment can effectively prevent any reproduction error which may be caused by a variation with time in the recording medium or the flaw or defect of the recording medium. In this embodiment, there has been shown an example in which re-recording is effected as the process of preventing any reproduction error, but alternatively, some informing means may be used to warn the user.

A third embodiment of the present invention will now be described.

In the above-described first embodiment, the window for discriminating the pulse of the binary data of the reproducing system has been reduced during the recording verification as compared with that during ordinary reproduction, while in this third embodiment, the window for discriminating the binary data of the reproducing system is reduced as compared with that during ordinary reproduction only when the synchronous pattern in the binary data is recording-verified.

Figure 1:
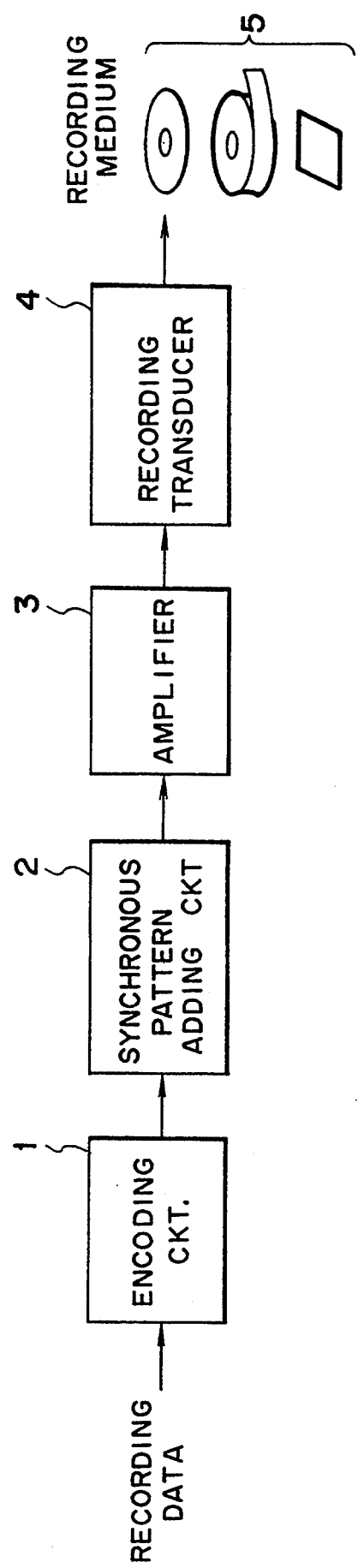
FIG. 1 is a block diagram-showing the construction of the recording system of an information recording-reproducing apparatus according to the prior art.
Figure 2:
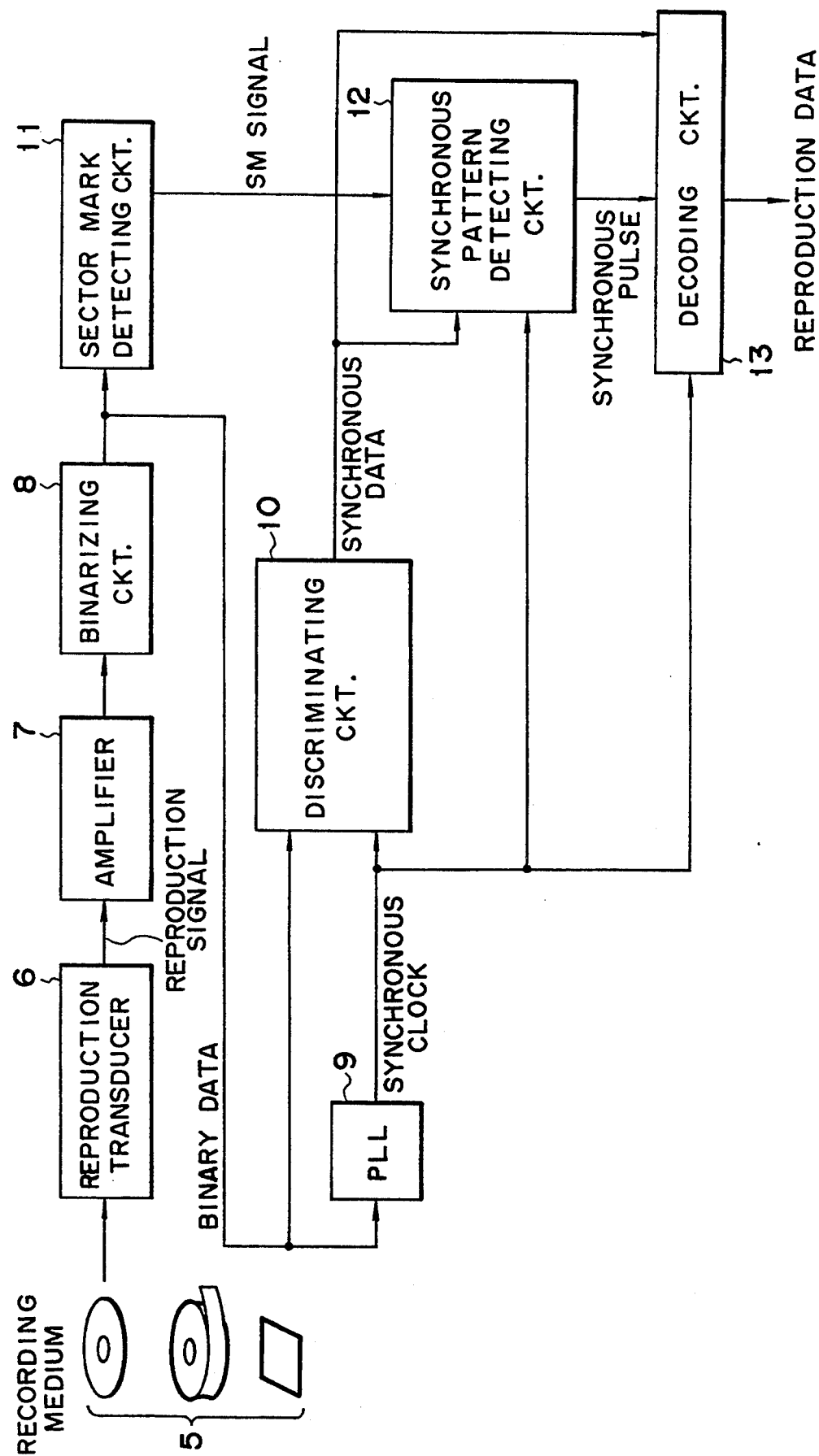
FIG. 2 is a block diagram showing the reproducing system of the apparatus.
Figure 3:
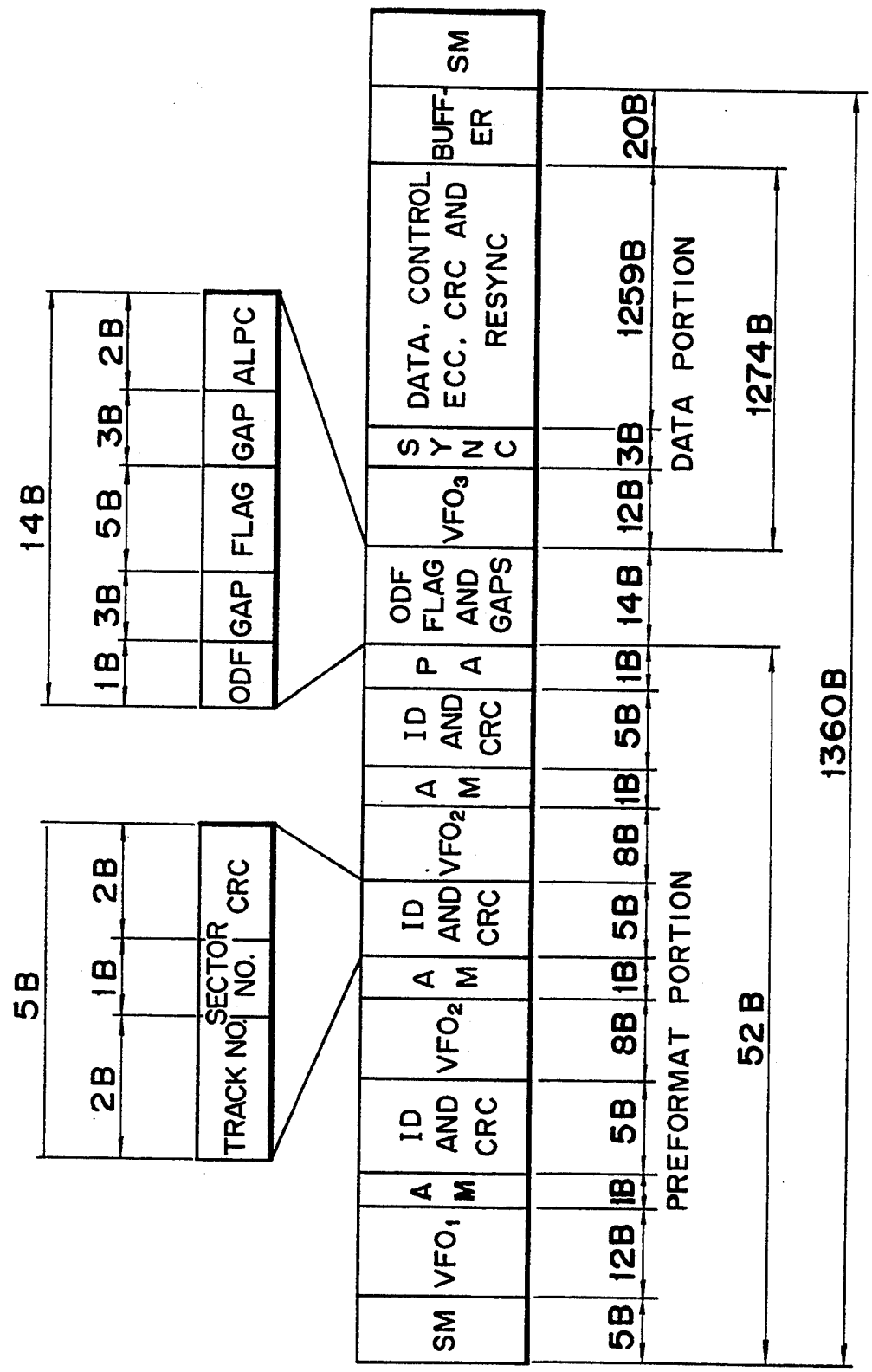
FIG. 3 is an illustration showing an example of the format of a recording medium.

As previously described with regard to the prior art, the reproduced binary data includes a synchronous pattern indicative of the read-out starting position of code data (the code data referred to here refers to data recorded on the data portion which excludes VFO3 and Sync portion in the data portion of the format shown in FIG. 3). During demodulation, this synchronous pattern is used to discriminate the starting position of the code data and demodulate the code data. Accordingly, unless this synchronous pattern is accurately read out, there will arise the problem that demodulation becomes impossible or wrong demodulation takes place. Therefore, a pattern sufficiently resisting any defect and whose self-correlation function has a sharp peak is chosen as such a synchronous pattern. However, such pattern has added thereto no error correction code as does code data and therefore, is narrower than code data in the tolerance for the error resulting from the defect or the like of the recording medium. Also, code data has added thereto an error correction code as previously described and therefore is correctable even if it has more or less defect, and is wider than the synchronous pattern in the tolerance for defect.

In view of such points, this third embodiment is designed such that the window for discriminating the binary data of the reproducing system is reduced as compared with that during ordinary reproduction only when the synchronous pattern in the binary data is recording-verified. Thereby any small defect or flaw on the recording medium is detected to prevent the detection error of the synchronous pattern which may result from such defect or flaw being overlooked.

The third embodiment will hereinafter be described with reference to the drawings. In the third embodiment, portions given the same reference numerals as those in FIG. 6 are the same in construction as the portions in FIG. 6 and need not be described.

The only difference of the third embodiment from the first embodiment is the function of the selector 18. Accordingly, only the function of the selector 18 will hereinafter be described.

The selector 18 is a circuit for selecting one of the first discriminating circuit 16 and the second discriminating circuit 17 in accordance with a select signal. This select signal is produced by the use of SM signal detected by a sector mark detecting circuit 11, the master clock of the apparatus and a recording verifying signal. The master clock is a clock of a predetermined frequency which provides the reference of the operation of the apparatus, and is produced by a reference frequency oscillator, not shown. As will be described later, the select signal is adapted to select the second discriminating circuit 17 when the synchronous pattern is detected during the recording verification, and to select the first discriminating circuit 16 during the other time. That is, when the synchronous pattern is to be reproduced during the recording verification, it is reproduced with the pulse discrimination detecting window reduced, whereby the abnormality of the synchronous pattern is cured early.

Description will now be made of the production of the select signal for selecting the first discriminating circuit 16 and the second discriminating circuit 17.

In FIG. 13, the sector mark detecting circuit 11 detects a sector mark recorded on the recording medium, and outputs the SM signal to a first counter 19. The sector mark, as shown in FIG. 14(a), is recorded at the head of the preformat portion of the recording medium, and the sector mark detecting circuit 11 detects it and output the SM signal shown in FIG. 14(c). The master clock is also input to the first counter 19, which counts the master clock by a predetermined number with the SM signal as the starting point. That is, by counting the master clock by a predetermined number, the first counter detects the starting point of the memory area of the recording medium for the synchronous pattern. FIG. 14(d) shows the output of the first counter 19, and this output arrives at the head of the memory area of the recording medium for the synchronous pattern when the first counter has counted a predetermined number of master clocks. When the first counter 19 has counted a predetermined number of master clocks, a second counter 20 counts the master clock by a predetermined number with the time when the counting by the first counter 19 has been terminated as the starting point, as shown in FIG. 14(e). This count number corresponds to the time for which the synchronous pattern is reproduced, and the time when the second counter 20 is counting the master clock by a predetermined number is the time when the synchronous pattern is being reproduced.

The recording area of the recording medium for the synchronous pattern is thus detected and the output signal of the second counter 20 is output as a synchronous pattern area detection signal to an AND circuit 21. That is, the period during which the output of the second counter 20 is at a high level is the time when the synchronous pattern is being reproduced, and this signal and the recording verifying signal shown in FIG. 14(b) are input to the AND circuit 21. The recording verifying signal assumes a high level during the recording verification carried out immediately after the recording operation, and holds a low level during the other time. Accordingly, when the AND of the output of the second counter 20 and the recording verifying signal is taken, the output of the AND circuit 21 assumes a high level only when the synchronous pattern during the recording verification is detected.

This high level signal is output to the selector 18 as a select signal for selecting the second discriminating circuit 17. Also, when the output of the AND circuit 21 is at a low level, the selector 18 selects the first discriminating circuit 16. Thus, the second discriminating circuit 17 is selected when the synchronous pattern during the recording verification is detected and therefore, as shown in FIG. 14(f), the synchronous data b of the second discriminating circuit 17 is output to the synchronous pattern detecting circuit 12 and the decoding circuit 13 through the selector 18. Also, during the reproduction of other data, the first discriminating circuit 16 is selected and the synchronous data a of the output thereof is sent to the synchronous pattern detecting circuit 12 and the decoding circuit 13. The output of the second counter 20 assumes a high level during the detection of the synchronous pattern and therefore is sent as a synchronous pattern area detection signal to the synchronous pattern detecting circuit 12. Thus, the synchronous pattern detecting circuit 12 detects the synchronous pattern only during the designated period, thereby preventing the wrong detection of the synchronous pattern.

Thus, the second discriminating circuit 17 having a narrow pulse discrimination detecting window is selected when the synchronous pattern during the recording verification is detected, and the synchronous pattern is detected by a detecting window narrower than the detecting window during data reproduction. Thereby, the abnormal reproduction signal as shown in FIG. 8 can be effectively detected and the abnormality resulting from a small defect or flaw of the recording medium which is likely to become an error in the future can be treated as a recording error. Accordingly, the situation in which reproduction will become impossible in the future due to a small defect or flaw of the synchronous pattern portion of the recording medium can be obviated and the reliability of recording information can be further enhanced.

A fourth embodiment of the present invention will now be described. FIG. 15 is a schematic block diagram of a recording system apparatus for carrying out the fourth embodiment of the present invention, and FIG. 16 is a schematic block diagram of a reproducing system apparatus for carrying out the fourth embodiment of the present invention.

The recording system apparatus is comprised of an error correction code adding circuit 31 for adding error correction codes to recording data, and a recording system 32 for recording on a recording medium the recording data to which error correction codes have been added by the circuit 31. The error correction codes include various codes such as a Hamming code, BCH code, a Reed Solomon code and a fire code.

The reproducing system apparatus is comprised of a drive controller 33 for controlling the selector 18, the reproducing system 34 shown in FIG. 13, and an error detection correction circuit 35 for correcting the error of data reproduced by the reproducing system 34. This fourth embodiment is such that during ordinary reproduction, the second discriminating circuit 17 is selected and the synchronous pattern is discriminated by a narrow pulse detecting window. If at this time, there are many reproduction errors and reproduction cannot be effected, the detecting window is widened and reproduction is effected again. In this embodiment, it is necessary that provision be made of a function such as CRC (error detection code) for judging whether the data reproduced during ordinary reproduction is right, or ECC (error detection correction code). The error detection correction circuit 35 is a circuit for detecting the error of reproduction data and carrying out the correction process, and if the errors of data are numerous and exceed the error correction ability of the circuit, this circuit outputs an error correction inability signal to the drive controller 33. If the drive controller 33 receives the aforementioned error correction inability signal when during ordinary reproduction, the synchronous pattern is reproduced with the pulse discriminating window reduced, the drive controller instructs the selector 18 to widen the pulse detecting window. Accordingly, when reproduction errors become numerous, the reproduction of the synchronous pattern is effected again with the pulse discriminating window widened as previously described.

In this embodiment, each time data is reproduced, the synchronous pattern is detected under more severe conditions and therefore, it is possible to prevent the situation in which data becomes irreproducible due to the deterioration of the characteristic of the recording medium caused by a variation with time in the medium, or a new flaw or stain formed on the synchronous pattern portion of the recording medium. Accordingly, again in this embodiment, the preservation reliability of recorded information can likewise be further enhanced.

While four embodiments have been described in the foregoing, the present invention is not restricted to these embodiments, but may be carried out with the first and second embodiments or the third and fourth embodiments combined together.

We claim:

1. An information processing apparatus having a function of reproducing digital information recorded on a recording medium, said apparatus comprising:

binarizing means for transforming a reproduction signal read from the recording medium into a binary signal;

means for forming from the binary signal a bit synchronous signal for use when the digital information is decoded;

means for detecting an inverted portion of the binary signal with a window of a predetermined period set on the basis of the bit synchronous signal and for producing a synchronous binary signal synchronized with the bit synchronous signal is accordance with a result of the detection;

decoding means for decoding the digital information on the recording medium on the basis of the synchronous binary signal and the bit synchronous signal; and means for widening the period of the window when reproduction of the digital information is impossible during normal reproduction.

2. An information processing apparatus according to claim 1, further comprising window forming means for forming the window, said window forming means comprising a plurality of window forming means having different window periods, said varying means selecting one of said plurality of window forming means to whereby vary the window period.

3. An information processing apparatus according to claim 1, wherein said varying means varies the period of the window during recording verifying check-up after data recording onto the recording medium.

4. An information processing apparatus according to claim 3, wherein the period of the window during the recording verifying check-up is narrower than the period of the window during ordinary reproduction.

5. An information processing apparatus having a function of reproducing digital information recorded on a recording medium, said apparatus comprising:

binarizing means for transferring a reproduction signal read from the recording medium into a binary signal;

means for forming from the binary signal a bit synchronous signal for use when the digital information is decoded;

means for detecting an inverted portion of the binary signal with a window of a predetermined period set on the basis of the bit synchronous signal and for producing a synchronous binary signal synchronized with the bit synchronous signal in accordance with a result of the detection;

decoding means for decoding the digital information on the recording medium on the basis of the synchronous binary signal and the bit synchronous signal;

means for varying the period of the window; and error correction means for correcting an error of the binary signal, wherein said varying means varies the period of the window in accordance with a result of the error correction by said error correction means, and wherein said varying means widens the period of the window in conformity with an increase in a number of error corrections or the success or failure of error correction.

6. An information processing apparatus according to claim 5, wherein when a number of error corrections by said error correction means is greater than a predetermined value or when error correction is impossible, the digital information is reproduced with the period of the window widened by said varying means and the reproduced digital information is re-recorded at a position discrete from the position on the recording medium at which reading has been effected.

7. An information processing apparatus according to claim 5, wherein when a number of error corrections by said error correction means is greater than a predetermined value or when error correction is impossible, the digital information is reproduced with the period of the window widened by said varying means and a warning is given to a user.

8. An information processing apparatus having a function of reproducing digital information recorded on a recording medium, said apparatus comprising:
- binarizing means for transforming a reproduction signal read from the recording medium into a binary signal;
- means for forming from the binary signal a bit synchronous signal for use when the digital information is decoded;
- means for detecting an inverted position of the binary signal with a window of a predetermined period set on the basis of the bit synchronous signal and for producing a synchronous binary signal synchronized with the bit synchronous signal in accordance with a result of the detection;
- decoding means for decoding the digital information on the recording medium on the basis of the synchronous binary signal and the bit synchronous signal; and
- means for varying the period of the window,
- wherein the digital information includes pattern synchronous information, and said varying means varies the period of the window when the pattern synchronous information is read out from the recording medium, and
- wherein said varying means makes the period of the window narrower than that during ordinary reproduction when the pattern synchronous information is read out from the recording medium.

9. An information processing apparatus according to claim 8, wherein said varying means varies the period of the window during recording verifying check-up after data recording onto the recording medium.

10. An information processing apparatus according to claim 8, further comprising error correction means for correcting an error of the binary signal and wherein said varying means varies the period of the window when the pattern synchronous information is read out, in accordance with a result of the error correction by said error correction means.

11. An information processing apparatus according to claim 10, wherein said varying means varies the period of the window when the pattern synchronous information is read out, in conformity with an increase in a number of error corrections or a success or failure of error correction.

12. An information processing apparatus according to claim 11, wherein said varying means widens the period of the window when the pattern synchronous information is read out in conformity with an increase in the number of error corrections or the success or failure of error correction.

13. An information processing apparatus according to claim 10, wherein when a number of error corrections by said error correction means is greater than a predetermined value or when error correction is impossible, the digital information is reproduced with the period of the window when the pattern synchronous information is read out widened by said varying means and the reproduced digital information is re-recorded at a position discrete from the position on the recording medium at which reading has been effected.

14. An information processing apparatus according to claim 10, wherein when a number of error corrections by said error correction means is greater than a predetermined value or when error correction is impossible, the digital information is reproduced with the period of the window when the pattern synchronous information is read out widened by said varying means and warning is given to a user.

* * * * *

UNITED STATES PATENT AND TRADEMARK OFFICE
CERTIFICATE OF CORRECTION

PATENT NO. : 5,347,517
DATED : September 13, 1994
INVENTOR(S) : SEIICHIRO SATOMURA, ET AL.

It is certified that error appears in the above-identified patent and that said Letters Patent is hereby corrected as shown below:

COLUMN 8

Line 3, "other" should read --another--.
Line 4, "exists" should read --exists an abnormality--.

COLUMN 12

Line 14, "whereby" should read --thereby--.

Signed and Sealed this

Twenty-first Day of February, 1995

Attest:

BRUCE LEHMAN

*Attesting Officer*  *Commissioner of Patents and Trademarks*